US009519975B2

(12) United States Patent
Wang

(10) Patent No.: US 9,519,975 B2
(45) Date of Patent: Dec. 13, 2016

(54) METHOD OF DETECTING EDGE UNDER NON-UNIFORM LIGHTING BACKGROUND

(71) Applicant: Hong Kong Applied Science and Technology Research Institute Co. Ltd., New Territories (HK)

(72) Inventor: Yan Wang, Kowloon (HK)

(73) Assignee: Hong Kong Applied Science and Technology Research Institute Co. Ltd., Hong Kong (CN)

( * ) Notice: Subject to any disclaimer, the term of this patent is extended or adjusted under 35 U.S.C. 154(b) by 533 days.

(21) Appl. No.: 14/149,839

(22) Filed: Jan. 8, 2014

(65) Prior Publication Data

US 2015/0193941 A1     Jul. 9, 2015

(51) Int. Cl.
| | |
|---|---|
| *G06K 9/50* | (2006.01) |
| *G06T 7/00* | (2006.01) |
| *G06F 3/042* | (2006.01) |
| *G06F 3/038* | (2013.01) |

(52) U.S. Cl.
CPC ............ *G06T 7/0085* (2013.01); *G06F 3/038* (2013.01); *G06F 3/042* (2013.01); *G06F 3/0425* (2013.01); *G06T 7/0097* (2013.01)

(58) Field of Classification Search
CPC .................. G06T 7/0083; G06T 2207/10016; G06T 2207/20144
See application file for complete search history.

(56) References Cited

U.S. PATENT DOCUMENTS

| | | | | |
|---|---|---|---|---|
| 5,675,664 A * | 10/1997 | Maeda | ................. | H04N 1/4092 382/199 |
| 6,418,238 B1 * | 7/2002 | Shiratani | ............... | G06T 7/0012 382/128 |
| 8,320,682 B2 * | 11/2012 | Froeba | ............... | G06K 9/00228 382/209 |
| 2004/0197015 A1 * | 10/2004 | Fan | ...................... | G06K 9/4609 382/128 |
| 2006/0291741 A1 * | 12/2006 | Gomi | ..................... | G06T 3/403 382/266 |
| 2007/0154097 A1 * | 7/2007 | Wang | .................... | G06T 7/0085 382/199 |

(Continued)

OTHER PUBLICATIONS

Djemel Ziou and Salvatore Tabbone, "Edge Detection Techniques—An Overview", International Journal of Pattern Recognition and Image Analysis, 1998, pp. 537-559, vol. 8.

(Continued)

*Primary Examiner* — Gandhi Thirugnanam
(74) *Attorney, Agent, or Firm* — Eagle IP Limited; Jacqueline C. Lui

(57) ABSTRACT

A method of determining an edge of an object on a digital image sequence comprising the step of determining a first gradient direction profile of a first image in the digital image sequence; determining a second gradient direction profile of a second image in the digital image sequence; computing a differential profile based on the first gradient direction profile and the second gradient direction profile; and determining the edge of the object based on the differential profile wherein the differential profile registers gradient magnitudes of the second gradient direction profile and angular differences between the first gradient direction profile and the second gradient direction profile. A system thereof is also disclosed.

19 Claims, 14 Drawing Sheets

(56) References Cited

U.S. PATENT DOCUMENTS

| | | | |
|---|---|---|---|
| 2009/0010546 A1* | 1/2009 | Rossato | G06K 9/38 382/199 |
| 2009/0016603 A1* | 1/2009 | Rossato | G06T 7/0083 382/173 |
| 2009/0028432 A1* | 1/2009 | Rossato | G06T 7/0083 382/173 |
| 2009/0041359 A1* | 2/2009 | Park | G06K 9/00771 382/199 |
| 2009/0154807 A1* | 6/2009 | Rossato | G06K 9/38 382/173 |
| 2009/0219379 A1* | 9/2009 | Rossato | G06T 7/0083 348/14.01 |
| 2010/0110209 A1* | 5/2010 | Border | G06T 7/2033 348/222.1 |
| 2011/0102624 A1* | 5/2011 | Hashizume | H04N 5/3675 348/222.1 |
| 2012/0026352 A1* | 2/2012 | Natroshvili | G06T 7/0085 348/222.1 |
| 2012/0076420 A1* | 3/2012 | Kono | H04N 5/142 382/199 |
| 2012/0243792 A1* | 9/2012 | Kostyukov | G06T 5/003 382/199 |
| 2012/0327241 A1* | 12/2012 | Howe | G06K 9/00771 348/155 |
| 2013/0088461 A1* | 4/2013 | Shamaie | G03B 21/14 345/175 |
| 2013/0223737 A1* | 8/2013 | Anbai | G06K 9/4671 382/170 |
| 2014/0119642 A1* | 5/2014 | Lee | G06K 9/00281 382/159 |
| 2014/0270346 A1* | 9/2014 | Tsin | G06T 7/0042 382/103 |
| 2015/0193941 A1* | 7/2015 | Wang | G06F 3/0425 348/571 |
| 2015/0199572 A1* | 7/2015 | Kim | G06K 9/00624 382/103 |

OTHER PUBLICATIONS

Wang Tong-Yao, "The motion detection based on background difference method and active contour model", Information Technology and Artificial Intelligence Conference (ITAIC), Aug. 20-22, 2011, pp. 480-483, vol. 2, Chongqing.

Jung Soh et al., "An edge-based approach to moving object location", in proceedings SPIE, Image and Video Processing II, Mar 1994, pp. 132-141.

* cited by examiner

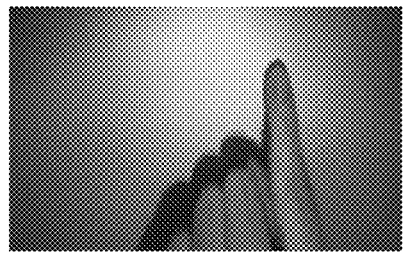
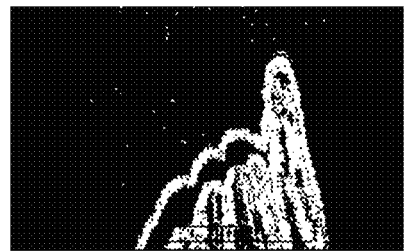
Figure 13a
Fig 13b
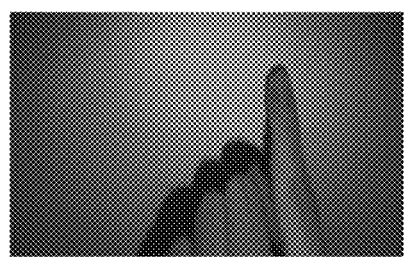
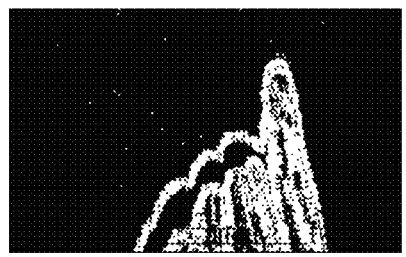
Figure 13c
Fig 13d

METHOD OF DETECTING EDGE UNDER NON-UNIFORM LIGHTING BACKGROUND

FIELD OF INVENTION

This invention relates to the field of detection, particularly detecting an edge of an object in a digital image.

BACKGROUND OF INVENTION

Edge detection is a basic but important procedure in computer graphics and image processing. It is used to detect the boundaries of an object in a digital image. Hence a reliable edge detection algorithm is much needed for any high level object recognition or similar image processing tasks. Almost all edge detection methods are essentially differential operators. They compute the intensity difference along a certain direction within a small neighborhood surrounding a pixel, and declare that an edge is found if the absolute difference exceeds a certain threshold. In many image processing/object recognition tasks, one side of the edge boundary is usually the background lighting while the other side is an object to be detected. When the background light intensity varies, it will affect the absolute difference. If the absolute difference is below the threshold, then the valid edge of the object will not be detected. If it is above the threshold, noisy signals will be detected as edges, creating many false edges. Hence it is technically challenging to develop a reliable edge detection algorithm under non-uniform background lighting condition.

One approach is to neutralize the background intensity variation by, for example, obtaining a profile of the non-uniform background intensity and then performing some sort of 'equalizer' operation to counter the non-uniformity effect. However, when the background light intensity varies over time and/or is not under the control of the image processing system, such approach would require re-calibrating the background intensity periodically. This is clearly not desirable.

SUMMARY OF INVENTION

In the light of the foregoing background, it is an object of the present invention to provide an alternative method and a system for detecting an edge of an object on a screen that is immune from background intensity changes. The method and system of the present invention is simple, accurate and easy to be implemented.

Accordingly, the present invention, in one aspect, is a method of determining an edge of an object on a digital image sequence comprising the steps of determining a first gradient direction profile of a first image in the digital image sequence; determining a second gradient direction profile of a second image in the digital image sequence; computing a differential profile based on the first gradient direction profile and the second gradient direction profile; and determining the edge of the object based on the differential profile wherein the differential profile registers gradient magnitudes of the second gradient direction profile and angular differences between the first gradient direction profile and the second gradient direction profile. The physical meaning of this method is to detect edge of the object in the direction with least possible background edge.

In one embodiment, the method further comprises the steps of capturing the first image wherein the object is not present in the digital image and capturing the second image wherein the object is present in the digital image.

In another embodiment, the first gradient direction profile and the second gradient direction profile are determined by computing a first gradient vector indicating a change of intensity for each pixel in the first image and a second gradient vector indicating a change of intensity for each pixel in the second image respectively.

In another embodiment, the step of computing the first gradient vector and the second gradient vector further comprises a step of obtaining a vector sum of a first directional derivative of intensity and a second directional derivative of intensity for each of the pixel in corresponding image; wherein the first directional derivative of intensity and the second directional derivative of intensity are perpendicular to each other.

In another embodiment, the first directional derivative of intensity is computed by convolving a first edge operator with each of the pixel in the corresponding image and the second directional derivative of intensity is computed by convolving a second edge operator with each of the pixel of the corresponding image.

In another embodiment, the first directional derivative of intensity is an x-directional derivative and the first edge operator is an x-direction edge detector; and the second directional derivative of intensity is a y-directional derivative and the second edge operator is a y-direction edge detector.

In another embodiment, the step of obtaining the differential profile further comprises the steps of computing a tangent of the first gradient vector; projecting the second gradient vector to the tangent; and calculating an absolute magnitude of the projection on the tangent.

In another embodiment, the projecting step further comprises the steps of finding a first component value by projecting an x-component of the second gradient vector onto the tangent; and finding a second component value by projecting a y-component of the second gradient vector onto the tangent wherein the absolute magnitude is calculated by computing an absolute difference of the first component value and the second component value.

In another embodiment, the edge of the object comprises a plurality of edge-pixels and the step of determining the edge of the object further comprises a step of declaring each pixel in the second image being an edge-pixel if the absolute magnitude calculated at that pixel is higher than a predefined threshold.

In another embodiment, the predefined threshold is one eighth of the mean intensity of all pixels in the second image.

In another embodiment, the method further comprising the steps of correcting geometric distortions of the first image and the second image; and downsampling the first image and the second image.

According to another aspect of the present invention is an interactive projection system comprising at least one light source configured to illuminate a surface; an optical detector configured to capture at least one image of the surface; a microprocessor coupled to the optical detector; and a non-transitory computer-readable storage medium coupled to the microprocessor. The non-transitory computer-readable storage medium encoded with computer-readable instructions for causing the microprocessor to execute the following steps: capturing a first image and a second image using the optical detector; determining a first gradient direction profile of the first image; determining a second gradient direction profile of the second image; computing a differential profile based on the first gradient direction profile and the second gradient direction profile; and determining the edge of the object based on the differential profile wherein the differential profile registers gradient magnitudes of the second gradient direction profile and angular differences between the first gradient direction profile and the second gradient direction profile.

In one embodiment, the interactive projection system further comprising a projection module configured to project a display on the surface.

In another embodiment, the at least one light source is an infrared light emitting diode configured to emit an infrared light to illuminate the surface.

In another embodiment, the wavelength of the infrared light is in the range of 845 nm to 855 nm.

In another embodiment, the optical detector further comprises an infrared bandpass filter.

In another embodiment, the infrared bandpass filter is configured to allow light with wavelength of 845 nm to 855 nm to pass through.

In another embodiment, the first image comprises a background and the second image comprises the background and the object.

In another embodiment, the non-transitory computer-readable storage medium is further encoded with computer-readable instructions for causing the microprocessor to execute the following steps: correcting geometric distortions of the first image and the second image; and downsampling the first image and the second image.

In another embodiment, the light source and the optical detector are substantially adjacent to each other.

There are many advantages to the present invention. In particular, the present invention is self-adapting to background light intensity variation. For example, the change of illumination may be caused by the drastic temperature increase or decrease of the system for automotive application. With the present invention, the need for periodic re-calibration is eliminated. Furthermore, the computation is much simplified, freeing up valuable computation resources to subsequent, high level tasks. Last but not least, the present edge detection algorithm yields better accuracy in detecting valid edge boundaries. There is hardly any need to perform any erosion and/or dilation operations afterwards to smooth out the edge boundaries or eliminate false detections.

BRIEF DESCRIPTION OF FIGURES

FIG. 8b is another diagram showing a different relationship between a foreground gradient direction vector $G_f$, the background gradient direction vector N and the tangent direction vector T of the same pixel at an edge of the object. The foreground gradient direction vector $G_f$ is on the other side of the background gradient direction vector N compared to FIG. 8a.

FIG. 13a shows an image whereby the background image is dim but the light intensity suddenly increases when a finger is presented and FIG. 13b is the corresponding edge boundary profile performed by the edge detection system of the present invention on FIG. 13a.

FIG. 13c shows another image whereby the background image is bright but the light intensity suddenly decreases when a finger is presented and FIG. 13d is the corresponding edge boundary profile performed by the edge detection system of the present invention on FIG. 13c.

DETAILED DESCRIPTION OF THE PREFERRED EMBODIMENTS

This invention discloses an image processing system capable of identifying the edge boundary of an object in a digital image sequence which is captured from the same view angle. The digital image sequence comprises at least two categories of images. The first category is the background images where the object is not at the scene and is referred to as the first images. The second category is images with the object appeared at the scene and is referred to as the second images or the foreground images. In one embodiment, the background is a surface and the object is on top of the surface. Furthermore, the object may or may not touch the object.

Figure 1:
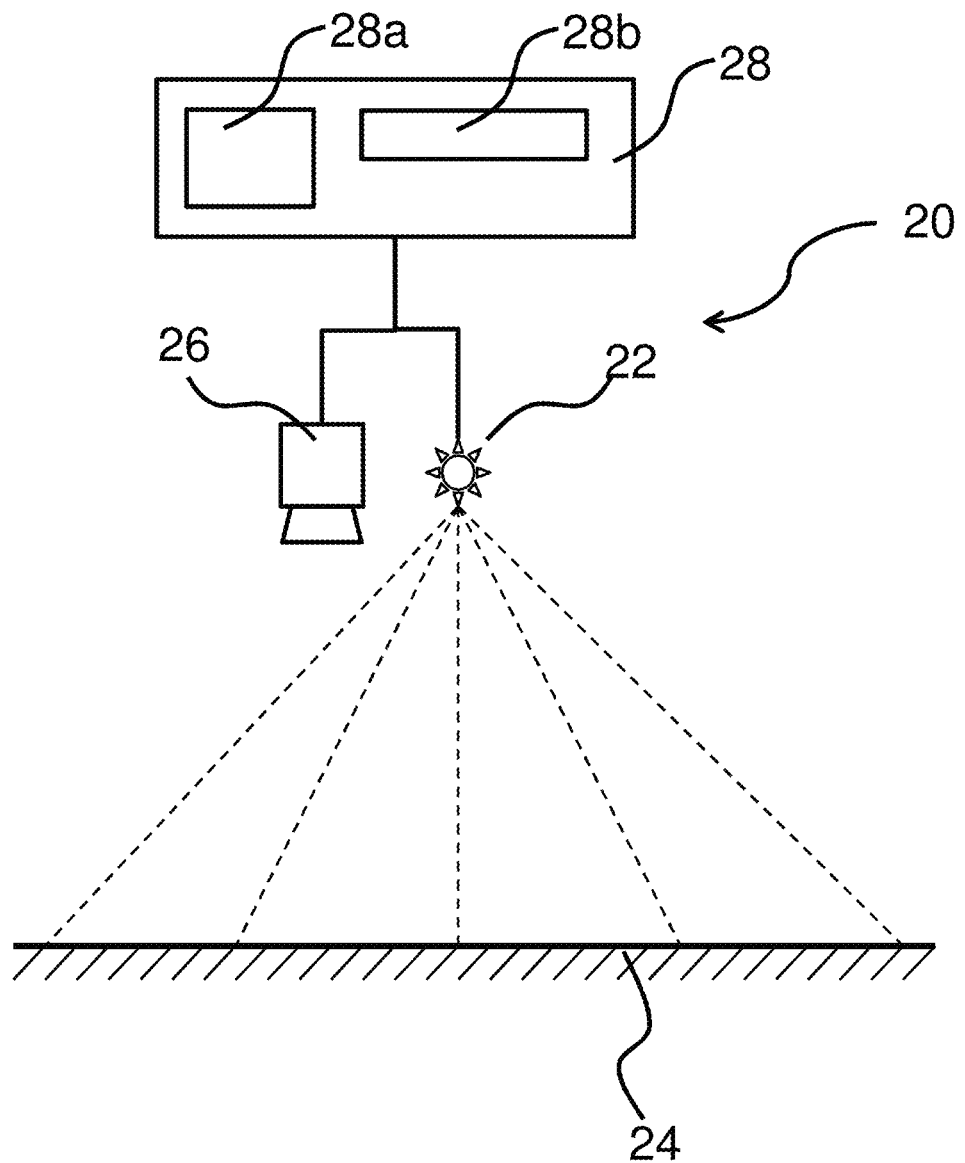
FIG. 1 is a schematic diagram of the edge detection system according to one of the embodiments of the present invention.

FIG. 1 shows a schematic diagram of the edge detection system 20 according to one of the embodiments of the present invention. The edge detection system 20 comprises a light source 22 configured to illuminate a surface 24, an optical detector 26 configured to capture at least one image of the surface 24, and a microcomputer 28 connected to the light source 22 and the optical detector 26. Since the distance between the light source 22 and each point on the surface 24 is different, the light intensity across the surface 24 varies. The microcomputer 28 further comprises a microprocessor 28a and a non-transitory computer-readable storage medium 28b. The microcomputer 28 is configured to control the light source 22 and the optical detector 26 via the microprocessor 28a according to the computer-readable instructions encoded in a non-transitory computer-readable storage medium 28b. The instructions cause the microprocessor 28a and thus the microcomputer 28 to execute the steps to be discussed in detail in the edge detection method below. In one embodiment, the light source 22 is an Infrared (IR) light source and the optical detector 26 is a camera that captures infrared (IR) light illuminated on and reflected from the surface 24. In one further embodiment, the infrared light is in the range of 845 nm to 855 nm and the optical detector 26 comprises an infrared bandpass filter configured to allow light with wavelength of 845 nm to 855 nm to pass through. In another embodiment, the edge detection system 20 comprises a plurality of light sources. In yet another embodiment, the light source 22 and the optical detector 26 are substantially adjacent to each other.

Figure 2:
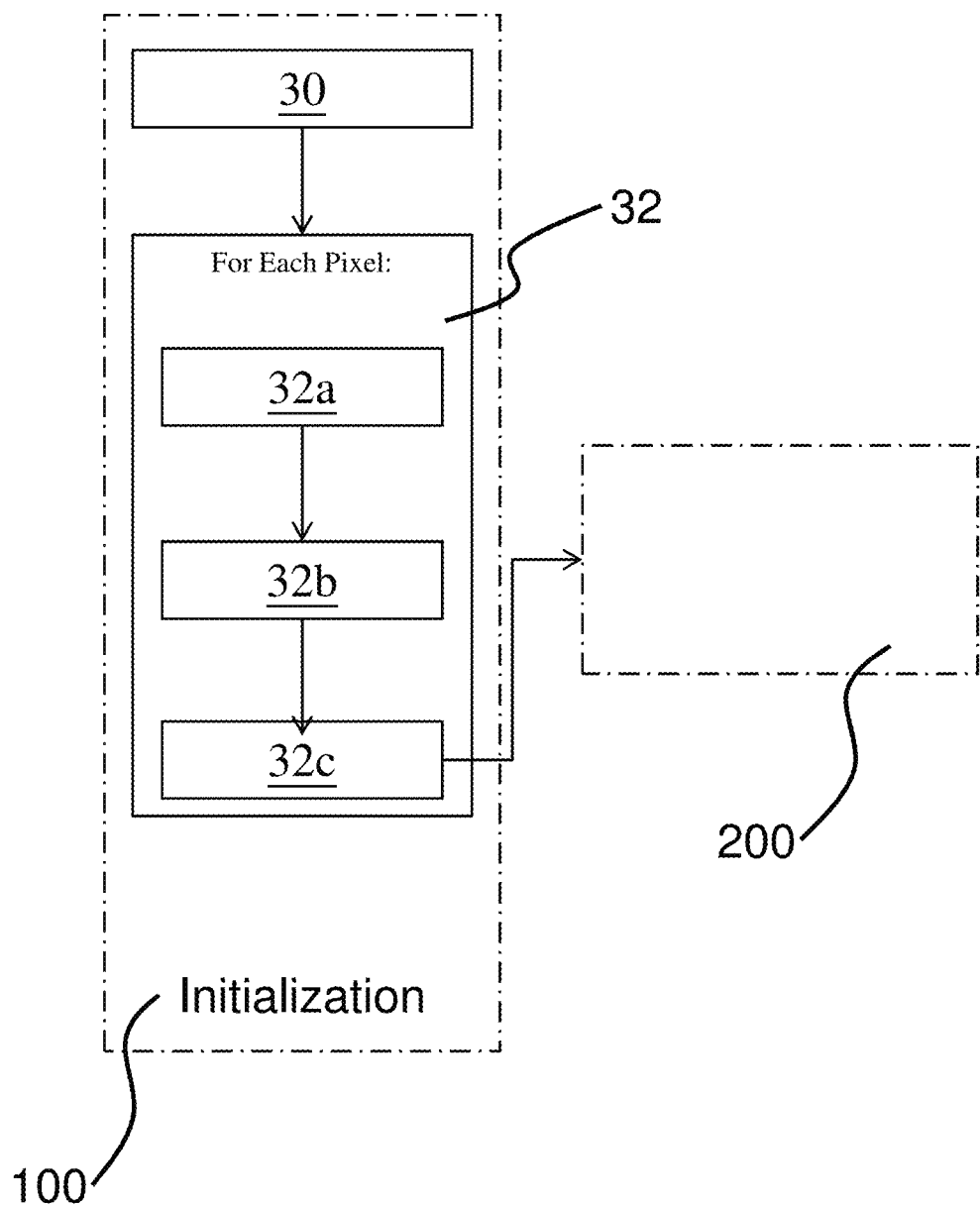
FIG. 2 shows a flow chart of an initialization step in the method of detecting an edge of the object on the surface according to one embodiment of the present invention.
Figure 3A:
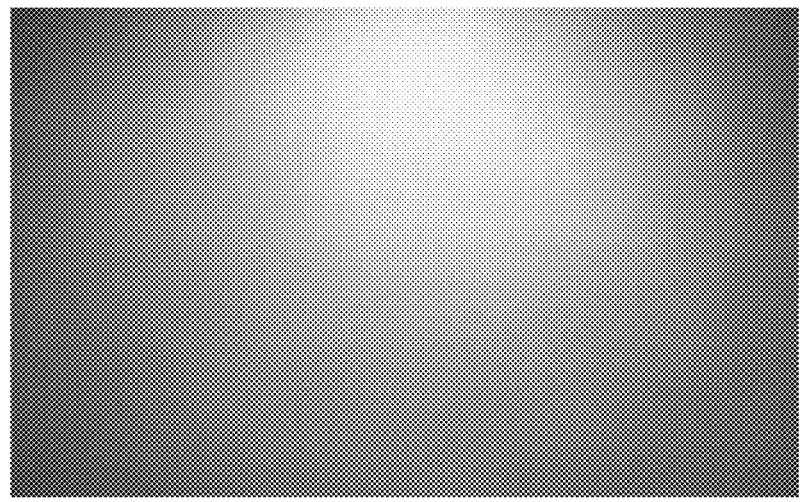
FIG. 3a shows a background image captured by the optical detector at the initialization step according to one of the embodiments of the present invention.
Figure 3B:
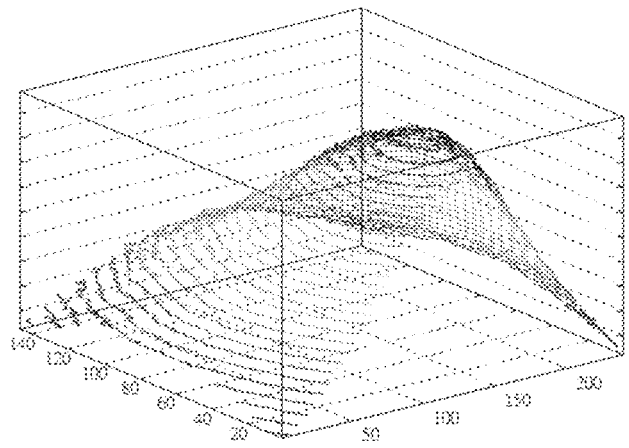
FIG. 3b is a contour map showing the light intensity variation across the background image according to one of embodiment of the present invention.

Now turning to the operation of the edge detection system 20 described above. It should be noted that the edge detection algorithm disclosed here can accommodate any non-uniform background light intensity. However, in order to simplify the discussion, a single light source is used below that provides an intensity profile as shown in FIGS. 3a and 3b. There are two main steps in detecting an edge of an object on a surface, which are the initialization step 100 and the online step 200. The initialization step 100 is performed once during system initialization time. Its objective is to obtain the background intensity gradient (detailed discussion below) and is performed before the online step 200 commences. FIG. 2 shows a flow chart of the initialization step 100 which starts from capturing a background image of the surface 24 with non-uniform light intensity in step 30. After that, a background gradient direction (or gradient vector) N and a background tangent direction (or tangent vector) T are found for each pixel in step 32. This will be described in detail below.

FIGS. 3a and 3b show the background image captured by the optical detector 26 and a contour map showing the variation of the light intensity across the background image on the surface 24 respectively in step 30. In this embodiment where there is a single light source 22, the highest light intensity is located at the upper center part of the background image/surface 24. This is because that part of the surface 24 has the shortest distance to the light source 22 compared to the other parts of the surface 24. The light intensity on the background image/surface 24 decreases steadily towards the edges of the background image/surface 24. All the gradient direction, tangent direction, x-directional derivative and y-directional derivative described herein are based on the light intensity.

Figure 4A:
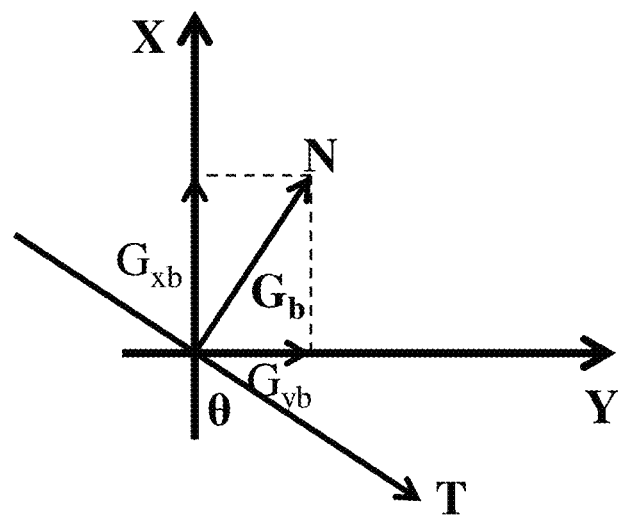
FIG. 4a shows the background gradient direction N and the background tangent direction T of a pixel in the background image according to one embodiment of the present invention.

After the capturing step in step 30, a background x-directional derivative of intensity $G_{xb}$ and a background y-directional derivative $G_{yb}$ of intensity for each pixel are computed. The x-coordinate and the y-coordinate in FIG. 4a are extended along the vertical direction of the image and along the horizontal direction of the background image respectively. The background x-directional derivative $G_{xb}$ of an interested pixel is determined by convoluting the interested pixel with the pixels immediately surrounding the interested pixel in step 32a. In one embodiment, it is determined by convoluting the interested pixel with 8 pixels immediately surrounding it. In one further embodiment, the background x-directional derivative $G_{xb}$ of the interested pixel is obtained by using the following Equation (1):

$$G_{x(i,j)} = \begin{pmatrix} -a & -b & -a \\ 0 & 0 & 0 \\ a & b & a \end{pmatrix} * \begin{pmatrix} p_{i-1,j-1} & p_{i-1,j} & p_{i-1,j+1} \\ p_{i,j-1} & p_{i,j} & p_{i,j+1} \\ p_{i+1,j-1} & p_{i+1,j} & p_{i+1,j+1} \end{pmatrix} \quad (1)$$

where a and b can be any integer. In another further embodiment, a and b is 1 and 2 respectively. The first matrix on the right side of Equation (1) is generally referred to as an x-direction edge detector. Also $P_{i,j}$ is the interested pixel and $P_{i-1,j-1}$, $P_{i-1,j}$, $P_{i-1,j+1}$, $P_{i,j-1}$, $P_{i,j+1}$, $P_{i+1,j-1}$, $P_{i+1,j}$ and $P_{i+1,j+1}$ are the pixels immediately surrounding the interested pixel $P_{i,j}$.

Similarly, the background y-directional derivative $G_{yb}$ of each pixel is determined by convoluting each pixel with the pixels immediately surrounding it in step 32b. In one embodiment, it is determined by convoluting the interested pixel with 8 pixels immediately surrounding it. In one further embodiment, the background y-directional derivative $G_{yb}$ of the interested pixel is obtained by using the following Equation (2):

$$G_{y(i,j)} = \begin{pmatrix} -a & 0 & a \\ -b & 0 & b \\ -a & 0 & a \end{pmatrix} * \begin{pmatrix} p_{i-1,j-1} & p_{i-1,j} & p_{i-1,j+1} \\ p_{i,j-1} & p_{i,j} & p_{i,j+1} \\ p_{i+1,j-1} & p_{i+1,j} & p_{i+1,j+1} \end{pmatrix} \quad (2)$$

where a and b can be any integer. In another further embodiment, a and b is 1 and 2 respectively. The first matrix on the right side of Equation (2) is generally referred to as a y-direction edge detector. Also $P_{i,j}$ is the interested pixel and $P_{i-1,j-1}$, $P_{i-1,j}$, $P_{i-1,j+1}$, $P_{i,j-1}$, $P_{i,j+1}$, $P_{i+1,j-1}$, $P_{i+1,j}$ and $P_{i+1,j+1}$ are the pixels immediately surrounding the interested pixel $P_{i,j}$.

After steps 32a and 32b, the background gradient direction N and background tangent direction T are computed in step 32c. The background gradient direction N is the vector sum of $G_{xb}$ and $G_{yb}$ and the background tangent direction T is perpendicular to N. The angle θ between the background tangent direction T and the x-coordinate for each pixel can be determined by using the background x-directional derivative $G_{xb}$ and the background y-directional derivative $G_{yb}$ of each corresponding pixel by the following Equations:

$$\theta = \tan^{-1}(G_{xb}/G_{yb}) \quad (3)$$

Figure 4B:
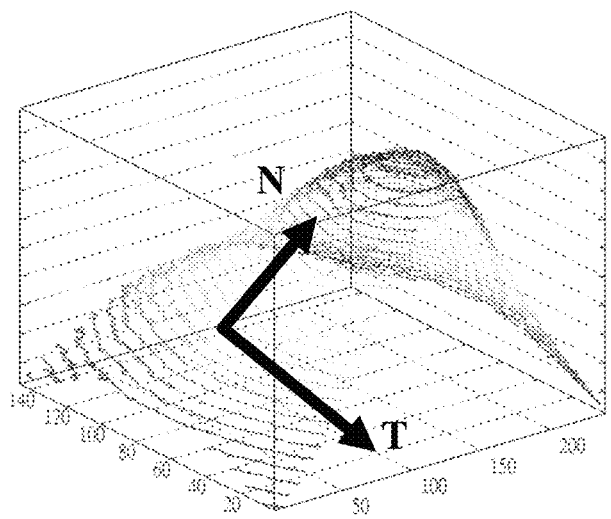
FIG. 4b is a contour map showing the background gradient direction N and background tangent direction T of a pixel in the background image according to one embodiment of the present invention.
Figure 5:
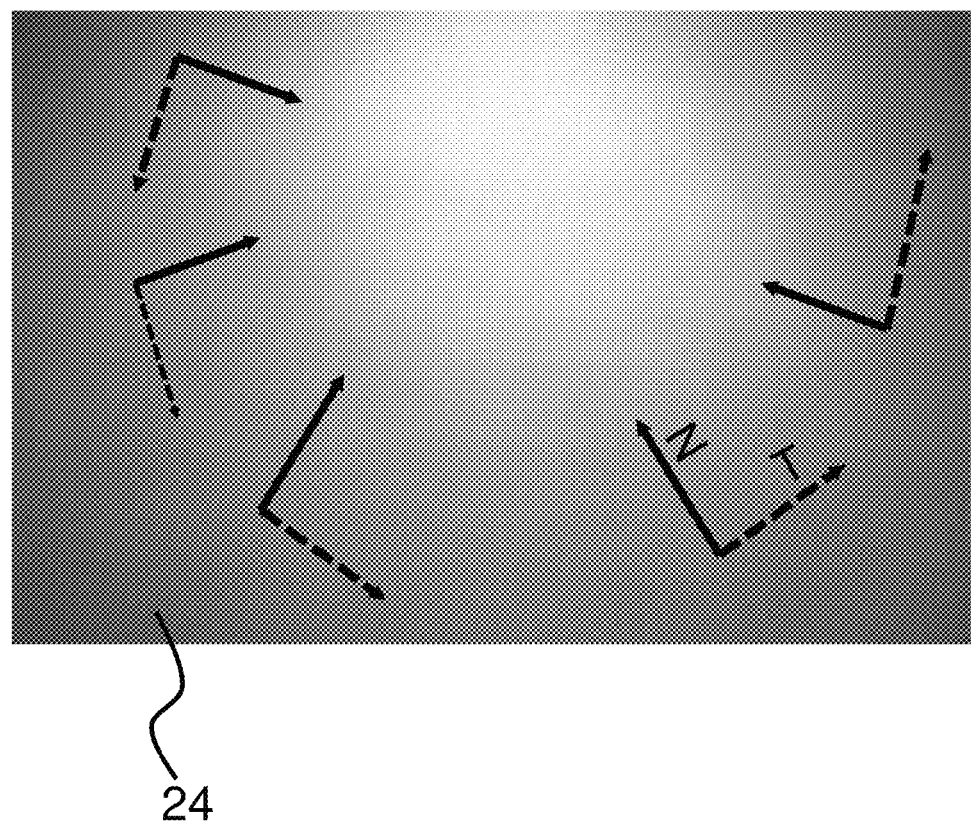
FIG. 5 is a background gradient direction profile showing background gradient directions N and background tangent directions T of a plurality of pixels in the background image according to one embodiment of the present invention.

FIG. 4b shows the background gradient direction N and the background tangent direction T for one of the pixels presented in a contour map. The angle θ is an important parameter for this edge detection algorithm. Either the value of this angle itself, or some functional values of this angle are then recorded/saved and forwarded to the online step 200 for subsequent use. A gradient direction profile thereby is formed after the background gradient directions N for all the pixels on the background image are determined. Likewise, the background tangent direction profile can also be obtained in a similar manner. FIG. 5 shows background gradient directions N and background tangent directions T of some of the pixels in the background image.

Figure 6:
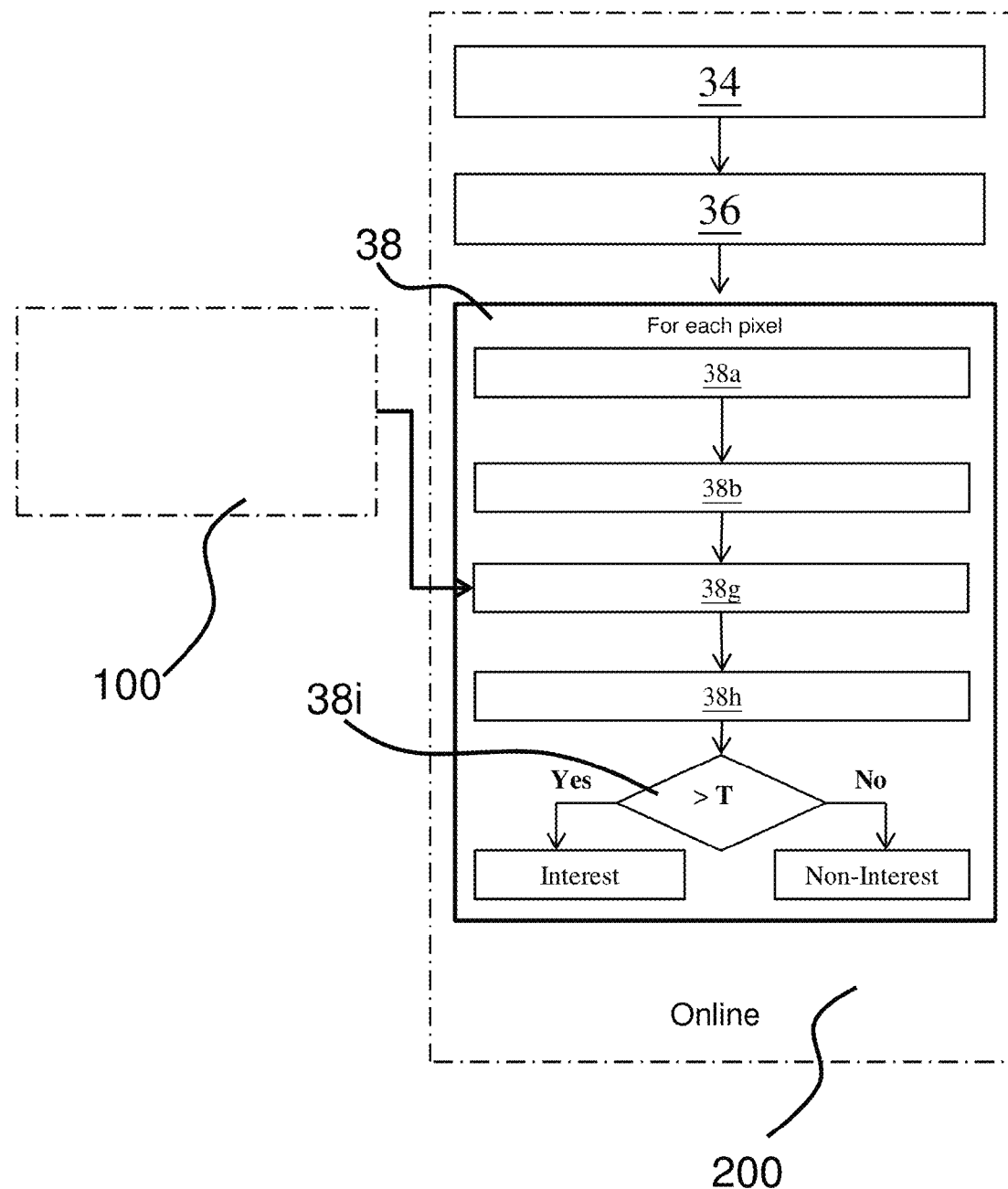
FIG. 6 shows a flow chart of an online step in the method of detecting the edge of the object on the surface according to the first embodiment of the present invention.

FIG. 6 shows a flow chart of the online step 200 according to a first embodiment of the present invention. The term 'online' here means that the edge detection system 20 is ready to process one or a sequence of digital images captured by the optical detector 26. In one embodiment, the online step 200, which runs after the initialization step 100, starts with capturing an image on the surface 24 frame-by-frame. When an object presents itself on the surface 24, both the surface 24 and the object are captured in step 34. The image with an object is hereafter referred to as foreground image.

After that, a threshold for determining whether a pixel is an edge of an object is set in step 36. The threshold is determined by the following formula:

$$\text{Threshold} = \frac{\text{mean of the intensity of the foreground image}}{m} \quad (4)$$

where m is in a range of 6 to 14. In one embodiment, m is equal to 8. This Threshold value is a global value to check if a pixel is a potential edge boundary point or not.

Afterwards, the foreground x-directional derivative $G_{xf}$ and the foreground y-directional derivative $G_{yf}$ are obtained respectively in steps 38a and 38b. Specifically, the foreground x-directional derivative $G_{xf}$ for an interested pixel is determined by using Equation (1) and the foreground y-directional derivative $G_{xf}$ of the interested pixel is determined by using Equation (2). In a similar manner, the foreground gradient direction (or gradient vector) $G_f$ is computed as the vector sum of $G_{xf}$ and $G_{yf}$. After this is processed for all pixels in the foreground image, a foreground gradient profile is then formed.

Figure 7:
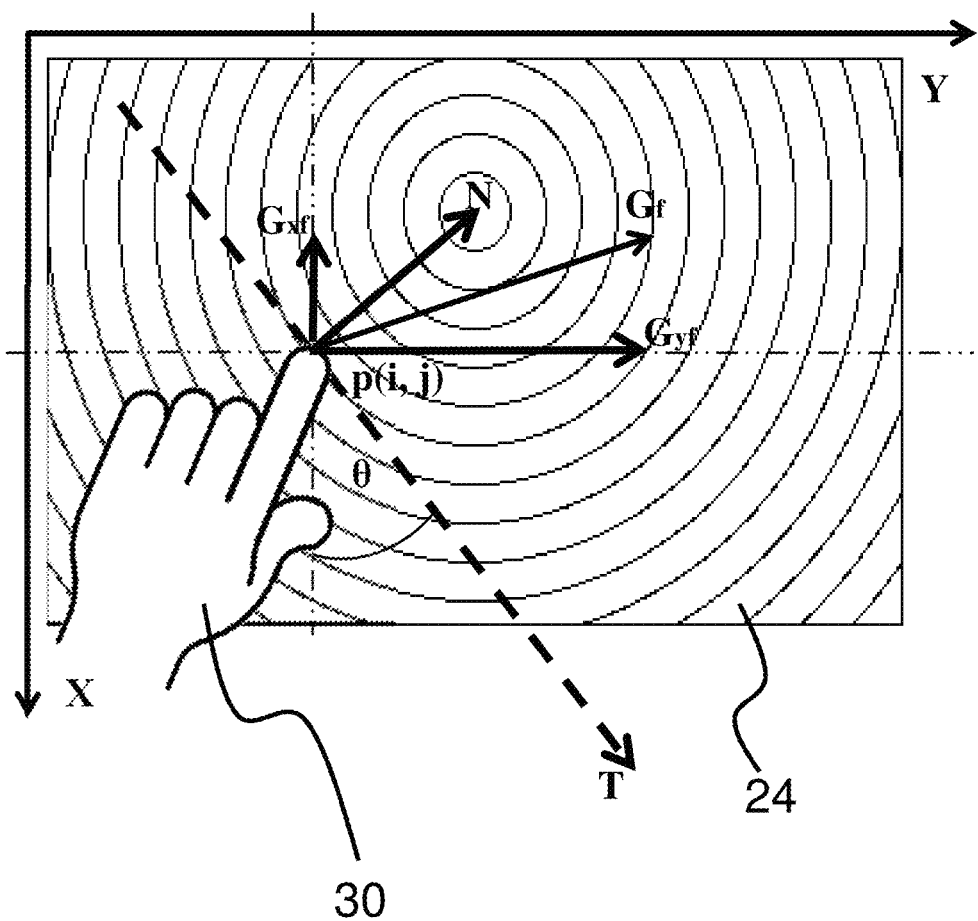
FIG. 7 is a schematic diagram of a foreground gradient direction at the edge of the object in a foreground image compared to the background gradient direction in a corresponding pixel of the background image according to one of the embodiments of the present invention.

FIG. 7 illustrates the situation when an object 30 (in this case the hand of a user) is presented on the surface 24. The vectors N and T, which denote the background gradient direction and background tangent direction respectively, are obtained from the initialization step 100 for this pixel. When comparing the background image and the foreground image, the foreground gradient direction $G_f$ for some pixels on the foreground image are different from the background gradient direction N in the background image due to the difference in reflectivity between the object and the surface 24. This is illustrated in FIG. 7 where at the edge boundary (in this case the tip of the finger) the magnitude and direction of $G_f$ are different from N for this pixel.

Figure 8A:
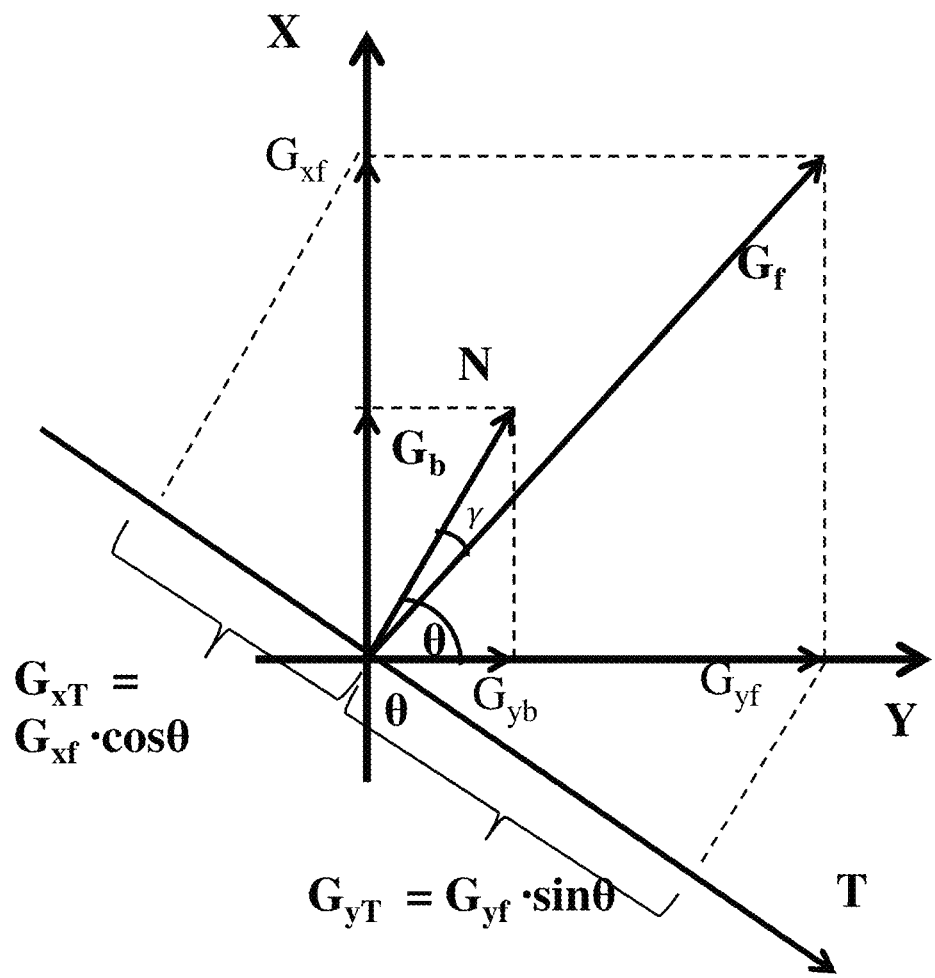
FIG. 8a is a diagram showing the relationship between a foreground gradient direction vector $G_f$, the background gradient direction vector N and the tangent direction vector T of the same pixel at an edge of the object.
Figure 8B:
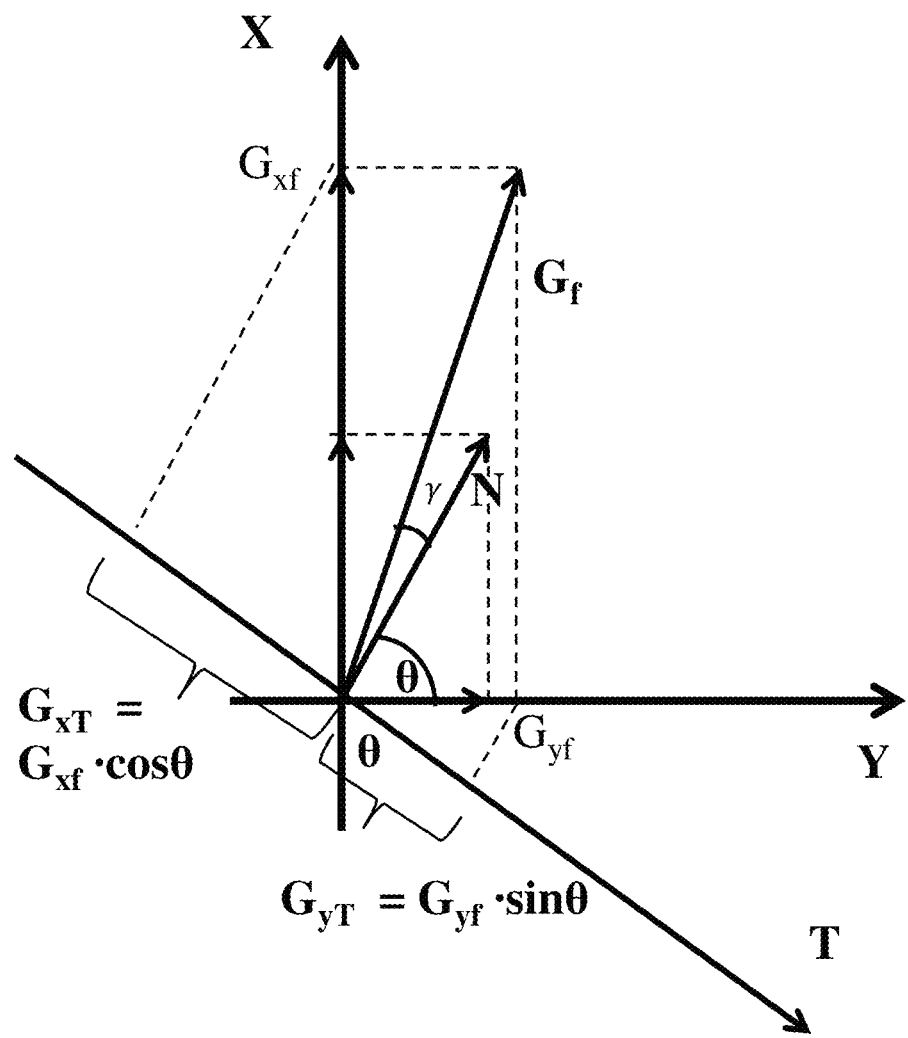

In one embodiment and referring to FIGS. 8a and 8b, the angle γ between the foreground gradient direction $G_f$ and the background gradient direction N is obtained in step 38g and a value $G_T$, which is the product of the magnitude of $G_f$ and the absolute value of sin(γ) is computed in step 38h for each pixel. This value $G_T$ is referred to as the differential value hereafter in this specification, In other words:

$$G_T = |G_f| \cdot \sin \gamma | \quad (5)$$

It can be observed that the value $G_T$ is the absolute value of the vector rejection of $G_f$ from N, i.e. the absolute magnitude value of the vector difference between the foreground gradient direction $G_f$ and its projection onto the background gradient direction N. By computing $G_T$ for all pixels in the foreground image, a differential profile is obtained. In essence, the differential profile is the profile of differential values $G_T$ for the entire foreground image.

For each pixel, the value $G_T$ is then compared with the Threshold value obtained in Equation (4) in step 38i. The pixel is declared to be a potential edge pixel if $G_T$ is higher than the Threshold. Otherwise, it is declared not an edge pixel.

Equation (5) can be simplified further. Refer to FIG. 8a, $$\begin{aligned} G_T &= |G_f| \cdot |\sin \gamma| \quad (6a) \\ &= |G_f| \cdot |\sin[\theta - (\theta - \gamma)]| \\ &= |G_f \cos(\theta - \gamma) \sin \theta - G_f \sin(\theta - \gamma) \cos \theta| \\ &= |G_{yf} \sin \theta - G_{xf} \cos \theta| \\ &= |G_{yT} - G_{xT}| \end{aligned}$$

where $G_{yT} = G_{yf} \sin \theta$ and $G_{xT} = G_{xf} \cos \theta$ and θ is the angle found in step 32c for the corresponding pixel in the initialization step 100.

When the foreground gradient direction $G_f$ is on the other side of the background gradient direction N as shown in FIG. 8b, Equation (5) can be re-written as:

$$\begin{aligned} G_T &= |G_f| \cdot |\sin \gamma| \quad (6b) \\ &= |G_f| \cdot |\sin(-\gamma)| \\ &= |G_f| \cdot |\sin[\theta - (\theta + \gamma)]| \\ &= |G_f \cos(\theta + \gamma) \sin \theta - G_f \sin(\theta + \gamma) \cos \theta| \\ &= |G_{yf} \sin \theta - G_{xf} \cos \theta| \\ &= |G_{yT} - G_{xT}| \end{aligned}$$

In either case, we have $$G_T = |G_{yT} - G_{xT}| \quad (7)$$

Referring to FIGS. 8a and 8b again, the value $G_{yT}$ is the projection of $G_{yf}$ onto the background tangent direction vector T while the value $G_{xT}$ is the projection of $G_{xf}$ onto the background tangent direction vector T. Hence, the value $G_T$ is the absolute difference between the projection of $G_{yf}$ and the projection of $G_{xf}$ onto the same background tangent direction vector T.

Figure 9:
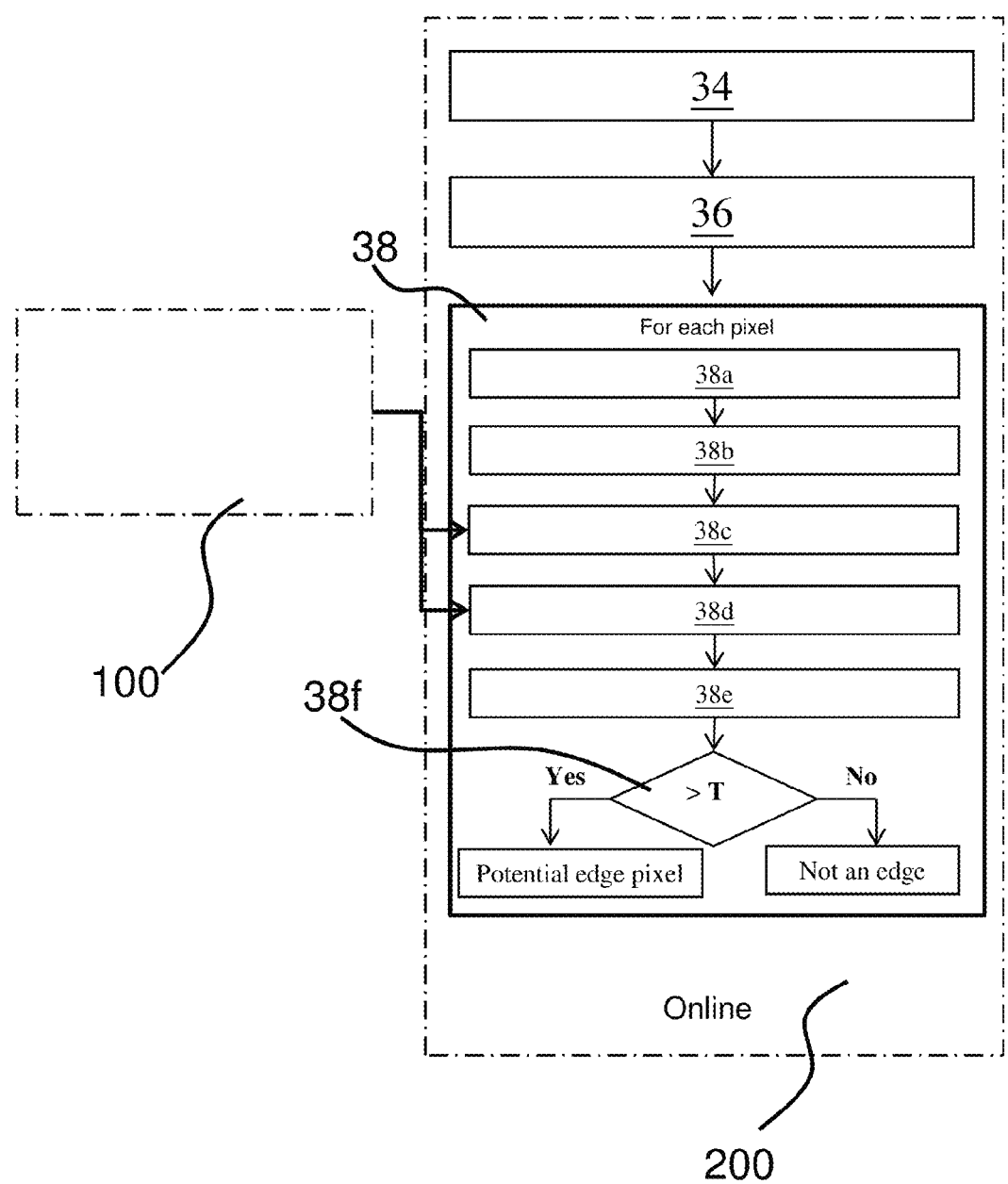
FIG. 9 shows another flow chart of the online step in the method of detecting an edge of the object on the surface according to second embodiment of the present invention.

Thus in another embodiment, a modified flow chart as shown in FIG. 9 is used to implement the online step 200. In this flow-chart, steps 34, 36, 38a and 38b are the same as that of FIG. 6 and are not repeated here. Step 38c is to compute $G_{xT}$, which is the projection of $G_{xf}$ onto the background tangent direction vector T as follows:

$$G_{xT} = G_{xf} \cos \theta \quad (8)$$

Similarly, step 38d is to compute $G_{yT}$, which is the projection of $G_{yf}$ onto the background tangent direction vector T as follows:

$$G_{yT} = G_{yf} \sin \theta \quad (9)$$

Thereafter, a total gradient $G_T$ is found in step 38e:

$$G_T = |G_{yT} - G_{xT}| \quad (10)$$

Similar to the flow chart presented in FIG. 6, the last step 38f is to compare the value of $G_T$ against the Threshold value and declare whether the pixel under examination is a potential edge pixel or not.

Figure 10A:
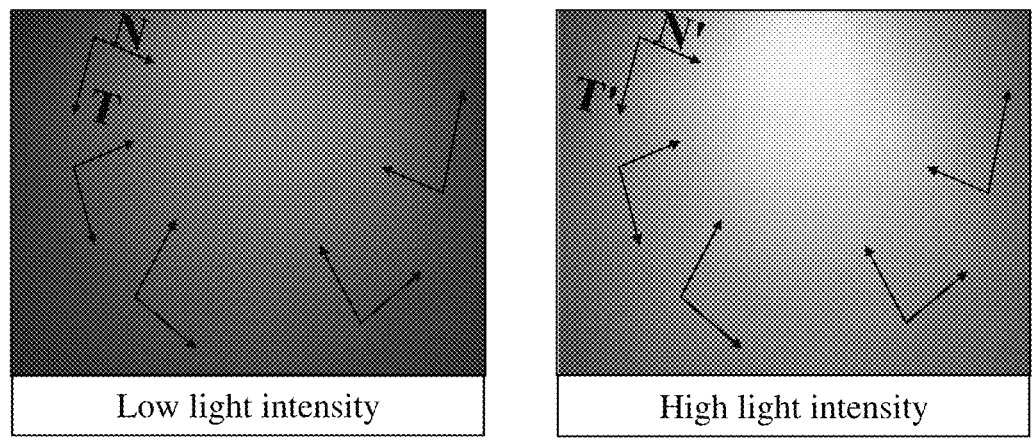
FIG. 10a shows the difference of foreground gradient direction profiles of the background images at different light intensity according to one embodiment of the present invention.
Figure 10B:
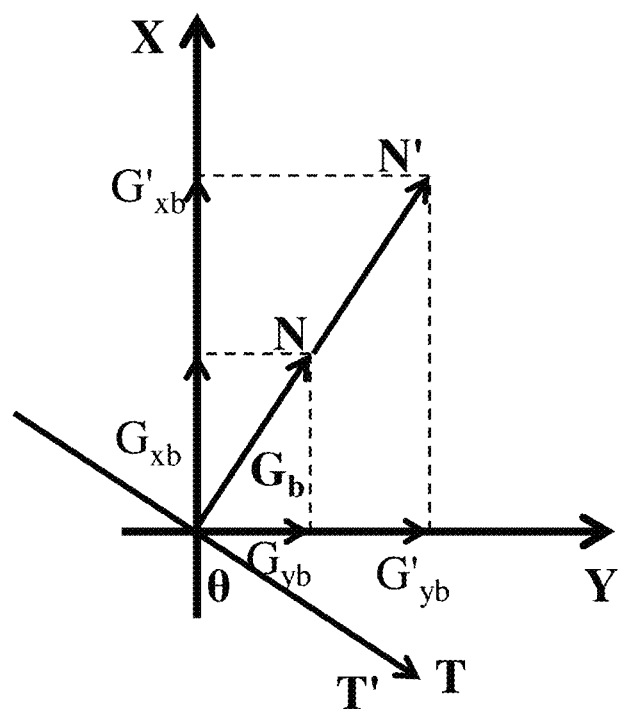
FIG. 10b shows the difference of background gradient directions of a pixel in the background images taken at different light intensity according to one embodiment of the present invention.

The method of this invention has several advantages. One of the advantages is that the edge detection by the method of the present invention is not affected by the change of light intensity on the surface 24 or noise generated by the light source 22 over time. This is particularly a problem when luminance generated by the light source 22 is affected by the environment. For example, if the edge detecting system 20 is installed in an automobile, the heat generated by the automobile may reduce the light intensity output. As shown in FIGS. 10a and 10b, the directions of background gradient directions N at low light intensity and the direction of background gradient directions N' at high light intensity remain mostly unchanged. As a result, the background gradient directions T at low light intensity and the background gradient directions T at high light intensity remain mostly unchanged as well. Therefore, the method of detecting an edge of the object of the present invention is not affected by any changes of background light intensity.

Figure 11:
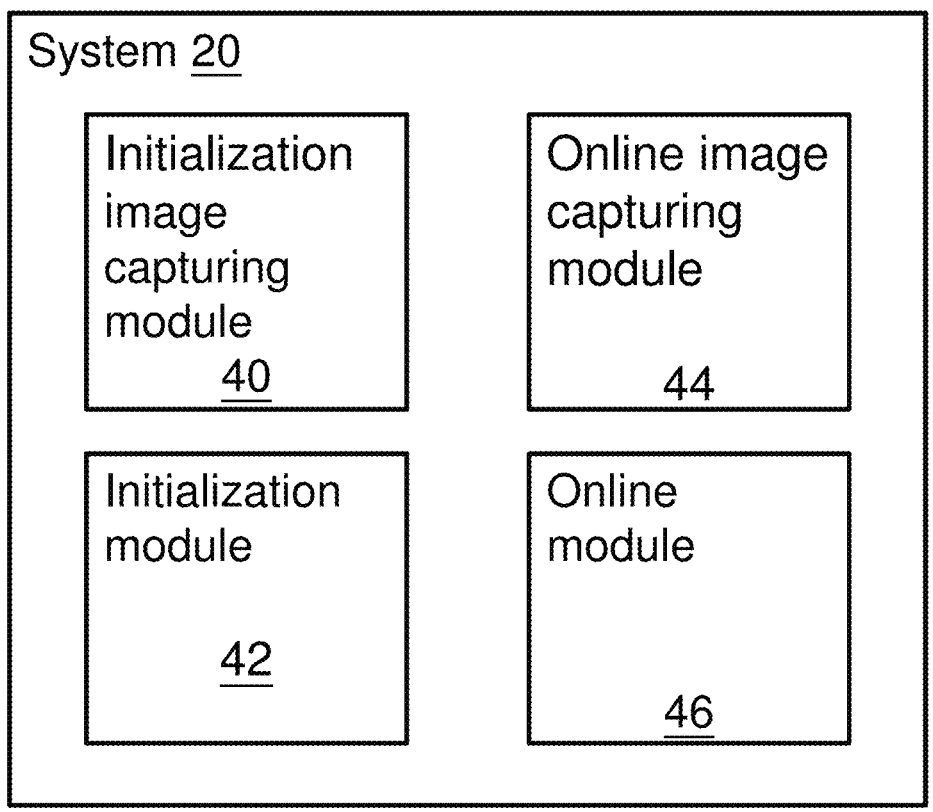
FIG. 11 is a schematic diagram of the edge detection system showing different modules according to one of the embodiments of the present invention.

FIG. 11 shows another aspect of the edge detection system 20 according to one embodiment of the present invention. In this aspect, the edge detection system 20 comprises an initialization image capturing module 40, initialization module 42, online image capturing module 44 and online module 46. The initialization image capturing module 40 is configured to perform the step 30 while the initialization module 42 is configured to perform step 32 (i.e. steps 32a-32c). Furthermore, the online image capturing module 44 is configured to perform step 34 and 36 while the online module 46 is configured to perform steps 38a, 38b, 38g, 38h and 38i in FIG. 6 or steps 38a to 38f in FIG. 9.

Figure 12:
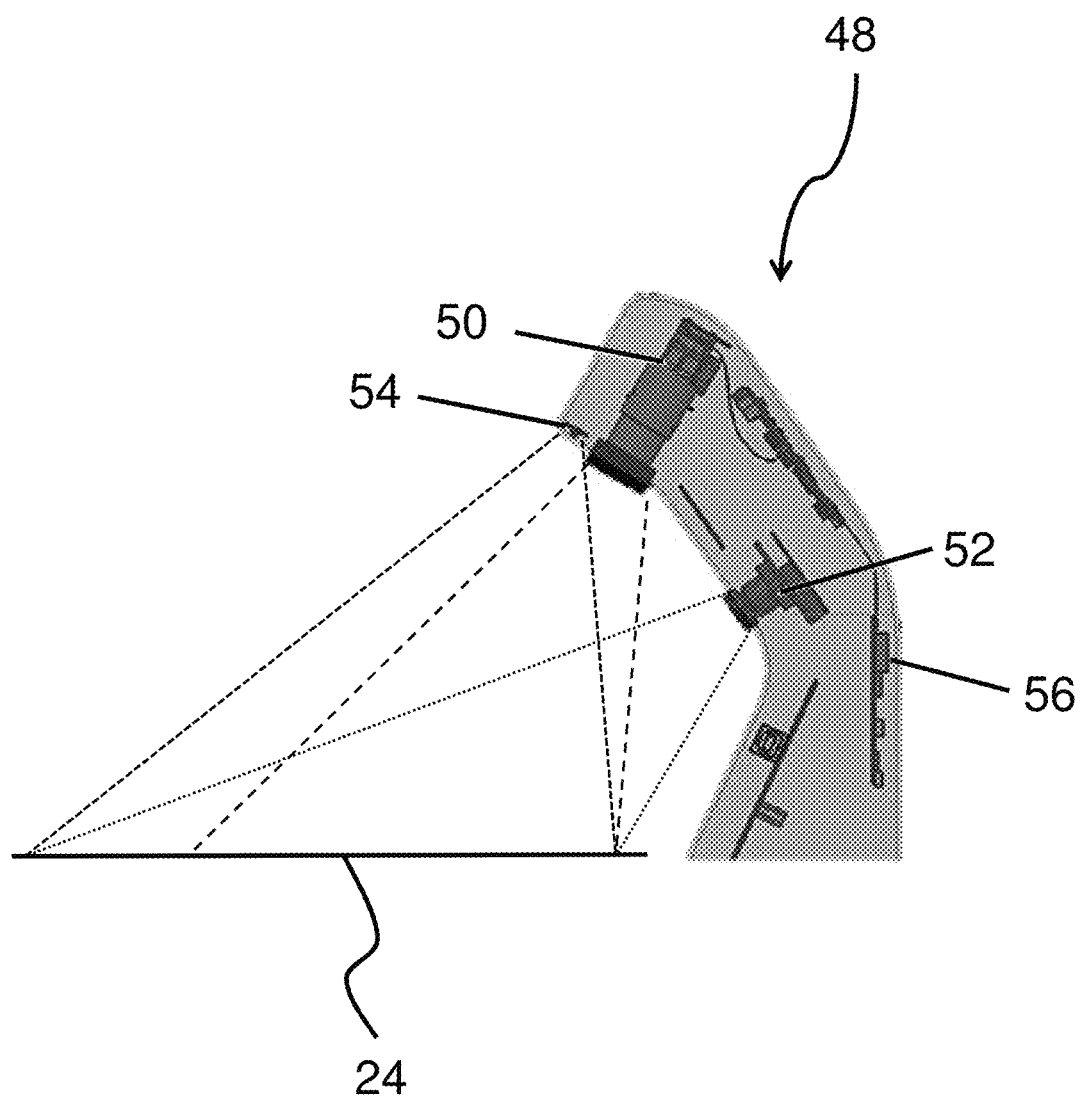
FIG. 12 is a schematic diagram of an image projector with the object detection system installed. In particular, the image projector is an interactive projector which has a finger touch detection system installed.

In one implementation, the edge detection system 20 is installed in an image projector 48 as shown in FIG. 12. The image projector 48 comprises a projector 50 to project an image onto a surface 24, an IR light source 54, an IR camera 52 and a microcomputer 56. In one application, the image projector 48 projects either a still image or a video image sequence onto the surface 24. Concurrently, the IR light source 54 irradiates the surface with infrared light and the IR camera 52 captures the IR light intensity reflected from the surface 24. In a further embodiment, the projected images, which are visible by humans, may contain clickable icons on the surface 24 for user to select. The user can then use his/her finger to point to an icon. The IR camera filters out the visible image and only process those light intensity in the IR spectrum. The edge detection system 20 can then identify the boundary of the human hand and finger from the IR image; and forward such information to higher level image processing modules in the image projector 48 to identify which icon the user is to click.

FIGS. 13a to 13d shows the experimental results of the present edge detection system. FIG. 13a shows an image whereby the background image is dim but the light intensity of the foreground image suddenly increases due to some unexpected reason (i.e. a drop of temperature), while FIG. 13b is the corresponding edge boundary profile performed by the edge detection system on FIG. 13a. Similarly, FIG. 13c shows another image whereby the background image is bright but the light intensity of the foreground image decreases (i.e. due to temperature rise). FIG. 13d is the corresponding edge boundary profile performed by the edge detection system on FIG. 13c.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A method of determining an edge of an object in a digital image sequence of a view angle comprising:

obtaining a first image from said digital image sequence and a second image from said digital image sequence; said object being presented in said second image;

determining a first gradient direction profile of said first image in said digital image sequence;

determining a second gradient direction profile of said second image in said digital image sequence;

computing a differential profile based on said first gradient direction profile and said second gradient direction profile; and determining said edge of said object based on said differential profile, wherein said differential profile registers gradient magnitudes of said second gradient direction profile and angular differences between said first gradient direction profile and said second gradient direction profile, wherein said differential profile includes absolute values of a product of said gradient magnitudes of said second gradient direction profile and sine values of said angular differences between said first gradient direction profile and said second gradient direction profile.

2. The method of claim 1 wherein said first gradient direction profile and said second gradient direction profile are determined by computing a first gradient vector indicating a change of intensity for each pixel in said first image and a second gradient vector indicating a change of intensity for each pixel in said second image.

3. The method of claim 2 wherein said computing said first gradient vector and said second gradient vector further comprises:

obtaining a vector sum of a first directional derivative of intensity and a second directional derivative of intensity for each said pixel in a corresponding image;

wherein said first directional derivative of intensity and said second directional derivative of intensity are perpendicular to each other.

4. The method of claim 3 wherein said first directional derivative of intensity is computed by convolving a first edge operator with each said pixel in a corresponding image and said second directional derivative of intensity is computed by convolving a second edge operator with each said pixel of a corresponding image.

5. The method of claim 4, wherein said first directional derivative of intensity is an x-directional derivative and said first edge operator is an x-direction edge detector; and said second directional derivative of intensity is a y-directional derivative and said second edge operator is a y-direction edge detector.

6. The method of claim 2, wherein said computing said differential profile further comprises:

computing a tangent of said first gradient vector;

projecting said second gradient vector to said tangent; and calculating an absolute magnitude of a projection on said tangent.

7. The method of claim 6, wherein said projecting said second gradient vector to said tangent further comprises:

finding a first component value by projecting an x-component of said second gradient vector onto said tangent; and finding a second component value by projecting a y-component of said second gradient vector onto said tangent;

wherein said absolute magnitude is calculated by computing an absolute difference of said first component value and said second component value.

8. The method of claim 6, wherein said edge of said object comprises a plurality of edge-pixels and said determining said edge of said object further comprises:

declaring each pixel in said second image being an edge-pixel if said absolute magnitude at said pixel is higher than a predefined threshold.

9. The method of claim 8, wherein said predefined threshold is one eighth of a mean intensity of all pixels in said second image.

10. The method of claim 1 further comprising:
correcting geometric distortions of said first image and said second image; and
downsampling said first image and said second image.

11. An interactive projection system comprising:
at least one light source that illuminates a surface;
an optical detector that captures at least one image of said surface;
a microprocessor coupled to said optical detector; and
a non-transitory computer-readable storage medium coupled to said microprocessor, said non-transitory computer-readable storage medium encoded with computer-readable instructions for causing said microprocessor to execute:
capturing a first image and a second image using said optical detector, wherein said first image is an image of said surface and said second image is an image having an object on top of said surface;
determining a first gradient direction profile of said first image;
determining a second gradient direction profile of said second image;
computing a differential profile based on said first gradient direction profile and said second gradient direction profile; and
determining said edge of said object based on said differential profile,
wherein said differential profile registers gradient magnitudes of said second gradient direction profile and angular differences between said first gradient direction profile and said second gradient direction profile,
wherein said differential profile includes absolute values of a product of said gradient magnitudes of said second gradient direction profile and sine values of said angular differences between said first gradient direction profile and said second gradient direction profile.

12. The interactive projection system of claim 11 further comprising a projection module that projects a display on said surface.

13. The interactive projection system of claim 11, wherein said at least one light source is an infrared light emitting diode that emits an infrared light to illuminate said surface.

14. The interactive projection system of claim 13, wherein a wavelength of said infrared light is in a range of 845 nm to 855 nm.

15. The interactive projection system of claim 11, wherein said optical detector further comprises an infrared bandpass filter.

16. The interactive projection system of claim 15, wherein said infrared bandpass filter allows light with wavelengths from 845 nm to 855 nm to pass through.

17. The interactive projection system of claim 11, wherein said first image comprises a background and said second image comprises said background and said object.

18. The interactive projection system of claim 11, wherein said non-transitory computer-readable storage medium is further encoded with computer-readable instructions for causing said microprocessor to execute:
correcting geometric distortions of said first image and said second image; and
downsampling said first image and said second image.

19. The interactive projection system of claim 11, wherein said light source and said optical detector are substantially adjacent to each other.

* * * * *